United States Patent Office 3,228,415
Patented Jan. 11, 1966

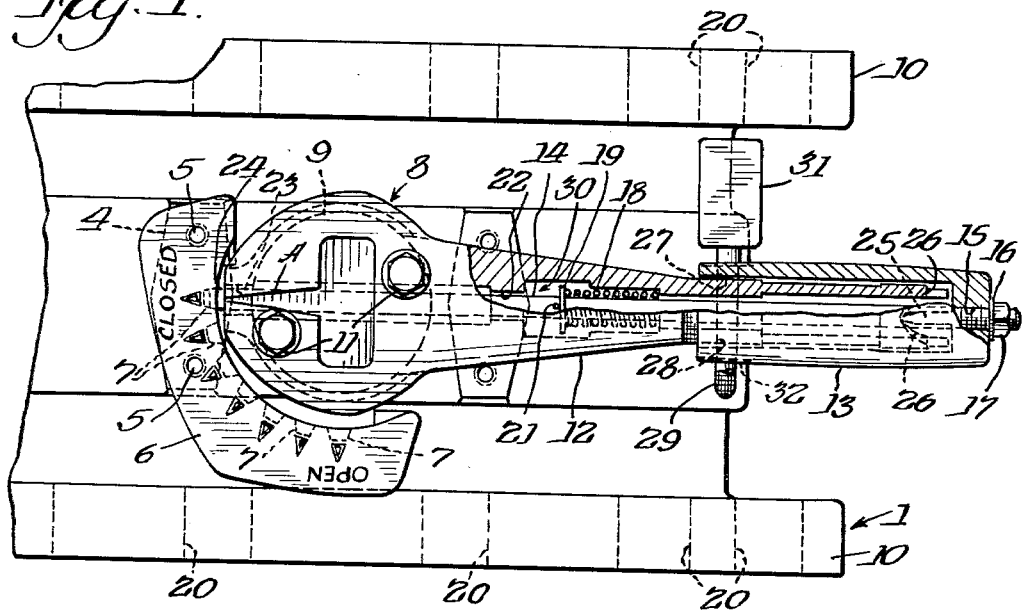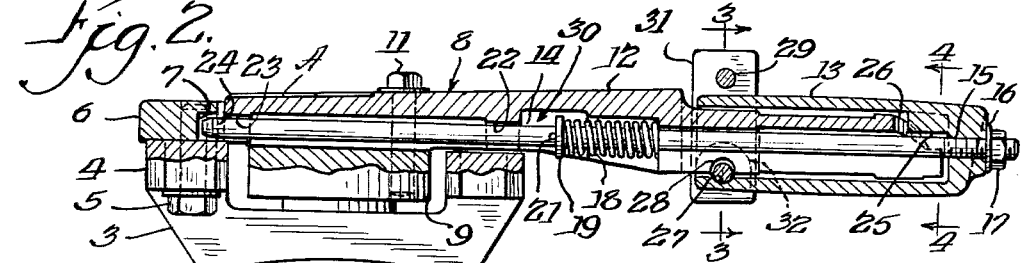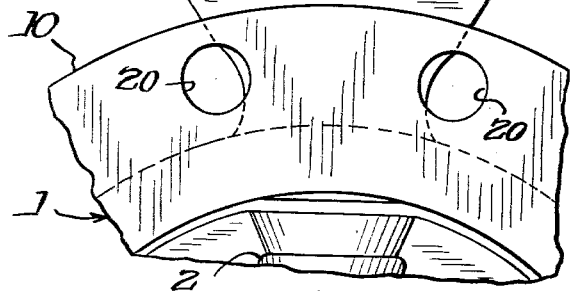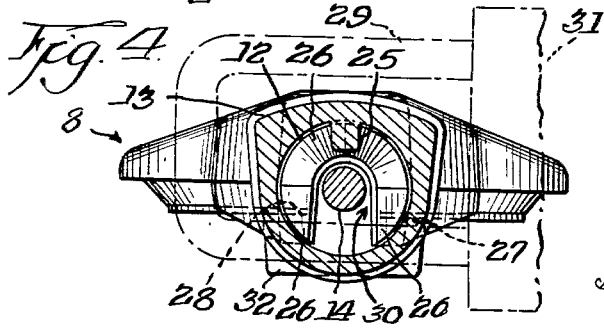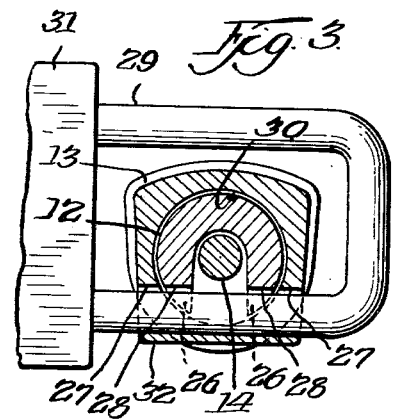
Fig. 1. Fig. 2. Fig. 3. Fig. 4.
Inventor.
John Richard Geiss

3,228,415
LOCKING MEANS FOR LATCHING
LEVER OPERATOR
John Richard Geiss, Woodbury, N.J., assignor to Crane Co., Chicago, Ill., a corporation of Illinois
Filed Nov. 12, 1963, Ser. No. 322,823
2 Claims. (Cl. 137—385)

This invention relates broadly to a valve actuating mechanism having locking means, and, more specifically, it is directed to a latching type of lever handle suitable for use with quarter-turn valves in which a padlock and the like may be employed therewith to prevent the unauthorized operation of the valve when the lever handle is set in any predetermined established position of the valve.

In order to obtain a better appreciation of the merits of this invention, it should be understood at the outset that in connecion with valves in the field, there is frequently the problem of securely and conveniently preventing unauthorized operation of the said valve. This is particularly true where, for example, the valve is of the quarter-turn variety in opening and closing operations as in butterfly valves, plug valves, ball valves, and the like. A serious problem has arisen in connection with the installation of these valves, particularly in remote areas of a pipeline, for example, to guard against vandalism and tampering. Obviously, such unauthorized conduct can be very serious, resulting in dangerous pipeline conditions in addition to interfering with processing. For example, in a manufacturing plant, the valves employed may control various fluids in such processing and the invention also prevents thievery and accidental movement of the valve from a selected position to which it is rotated.

It is therefore one of the more important objects of the present invention to provide in combination a relatively simple easily set quarter-turn lever handle cooperating with a suitable stop mechanism on the valve and which is capable of employing an economical, but effective, lock means, such as a padlock for example. As a matter of fact, as the description hereinafter follows, it will be apparent that other locking means than a padlock may be employed, as, for example, certain types of pins with tumbler locks actuated by a tumbler or bolt lock integrally built into the lever handle. Also, instead of a padlock, a special tool may be used to secure the locking means instead of a key.

Another important object is to provide for a locking construction in combination with the lever handle in which the construction can be accomplished at a moderate cost and yet possesses the advantage of not requiring any special parts other than those initially present in the lever handle. Further, the object is to provide a sturdy mechanism in which preferably no protruding parts are used to inhibit or interfere with the practical function of the handle when a lock becomes unnecessary.

Other objects and advantages will become more readily apparent upon proceeding with the following description read in light of the accompanying drawings, in which:

FIG. 1 is a plan fragmentary view of the invention applied to a latching lever installed on a butterfly valve;

FIG. 2 is a fragmentary transverse sectional assembly view of the construction shown in FIG. 1;

FIG. 3 is a magnified fragmentary sectional view taken on the line 3—3 of FIG. 2; and FIG. 4 is a magnified fragmentary sectional view taken on the line 4—4 of FIG. 2.

Similar reference numerals refer to similar parts throughout the several views.

Referring now to FIG. 1, a valve generally designated 1 is shown, which in this case, is of the butterfly type wherein the closure member (shown in FIG. 2) moves within substantially 90° of rotative travel in opening and closing the valve. The valve body is flanged at 10 with bolt-holes 20 for attachment to a pipeline. The application of this invention to a butterfly valve as shown in the drawings is merely for purpose of illustration, since, as previously stated, other types of rotary valves may be employed, such as ball valves, plug valves, and similar valves, having closure member moving rotatably within a 90° travel. As shown more clearly in FIG. 2, the casing 1 is provided preferably with an integral bracket support 3 having its upper limits as at 4 fitted with suitable bolts or cap screws as indicated at 5 for receiving the positioning means or locating flange 6 which as indicated is provided with a suitable configuration for indicating the open and closed positions of the valve as illustrated and also notched as at 7 for purpose hereinafter to be explained. The locating flange 6 is of generally arcuate form and extends substantially through 90° as shown to allow for said rotative travel of the valve closure member 2. The handle generally designated 8 is non-rotatably attached to the coupling 9 by means of suitable cap screws 11 oppositely disposed as shown more clearly in FIG. 1.

The handle assembly 8 is of generally hollow configuration as at 30 on its underside and consists of the lever body 12 and the hollow handle 13 overlying the lever body 12. A predeterminately reciprocally movable rod 14 is fixedly secured to the outer end of the handle 13 at the threads 15, the lock washer 16 and the locknut 17. As shown, the said rod 14 is spring loaded as indicated by the coil spring 18 bearing against the washer 19, the latter being held against transverse movement by means of the rod pin 21. It will be noted that the hollow underside portion of the lever body 12 is provided with the spaced-apart guide recesses 22 and 23, the latter recesses being apertured to allow for the projection predeterminately of the rod 14 as at 24 to engage the arcuately arranged spaced-apart notches 7 as shown more clearly in FIG. 1. The rod 14 is reciprocally movable predeterminately and is biased against the coil spring 18 by means of a suitable integral lug or projection 25 cast preferably integrally on the inner end limit of the handle 13 for engagement by the cam surface 26 of the lever body 12. Thus, upon suitable rotation of the handle 13 in either one of a plurality of directions, there will be effected relative movement between the lug 25 and the slidably engageable cam surface 26 of the lever body 12 whereby to cause the handle 13 to be moved longitudinally relative to the lever body 12. The said movement of the handle 13 carries the rod 14 with it in view of the latter member being fixedly secured to the handle 13 as previously stated. Thus it will be apparent upon such rotation of said handle the rod 14 may be moved in and out of engagement with the notches 7 of the locating flange 6 whereby to fix the rotative position of the valve closure member 2 relative to the full open or full closed valve position and any intermediate points therebetween as so desired and as provided by the spacing of the notches 7.

This type of construction has been previously employed, but has lacked convenient and secure locking means to prevent the tampering and unauthorized handling of the valve as above referred to.

Accordingly, the handle 13 is drilled as at 27 and the lever body is correspondingly drilled as at 28 to align with the drilling 27 to receive the hasp 29 of the padlock 31. Thus, with the hasp in position illustrated, the rotation of the handle 13 relative to the lever body 12 is prevented and the rod 14 is locked in position against longitudinal movement.

In FIG. 1, as indicated, the valve is locked in the closed position as indicated by the arrow designated A, preferably integrally cast on the upper surface of the lever body 12 thereby to indicate to the valve operator the position of the valve closure member in the valve casing 1.

As shown more clearly in FIG. 3, it will be appreciated that in order to facilitate the relative drilling at 27 and 28 between the handle 13 and the lever body 12, a depending boss 32 has been provided.

Thus it will be apparent that in a type of valve operating handle in which a reciprocally movable spring-loaded rod is employed, a novel mechanism has been devised for purpose of locking a valve securely against tampering as well as providing suitable indicating means for showing the maximum open and closed valve positions in addition to the intermediate position.

While only a single embodiment has been shown and described, it will be appreciated that this is for purpose of illustration only and not limitation. Therefore, the scope of the invention should be measured by the appended claims read in light of the prior art.

I claim:

1. A locking mechanism for quarter turn valves or the like, the combination of a latching lever predeterminately engageable with the valve, the valve body having arcuately disposed relieved means for effecting said predetermined engagement with the latching lever, the said latching lever having a rod reciprocally movable relative to the lever, the said lever consisting of a body and an end disposed handle rotatable relative to the said lever body, the said handle being grooved at an underportion thereof to overlie said lever body and having at a closed outer end portion thereof an integral projection, the said lever body having at an outer end portion thereof cam surface means for predetermined engagement by said handle integral projection, the said rod being resiliently mounted and being fixed to the said handle so that upon limited rotation of said handle relative to said lever body in either one of a plurality of directions said rod is moved longitudinally relative to said lever body for predetermined engagement and disengagement of the latching lever with the said valve body arcuately disposed relieved means, and locking means simultaneously engaging transversed aligned apertured portions of said lever body and handle when the said handle rod is in engagement with the said valve body arcuately disposed relieved means.

2. The subject matter of claim 1, the said locking means consisting of a padlock with a hasp portion thereof engageable with said lever body and handle through said apertured portions.

References Cited by the Examiner
UNITED STATES PATENTS

| | | | |
|---|---|---|---|
| 958,735 | 5/1910 | Ericson | 251—110 |
| 1,523,654 | 1/1925 | Laslett | 74—489 |
| 1,893,775 | 1/1933 | Heaslet | 74—536 |
| 2,476,195 | 7/1949 | Horman | 74—536 X |
| 2,979,076 | 4/1961 | Kish | 137—556.6 |

FOREIGN PATENTS

| | | |
|---|---|---|
| 654,351 | 11/1928 | France. |
| 6,892 | 3/1910 | Great Britain. |
| 914,727 | 1/1963 | Great Britain. |

M. CARY NELSON, *Primary Examiner.*

H. KLINKSIEK, *Examiner.*